(12) United States Patent
Kurashina

(10) Patent No.: US 7,474,421 B2
(45) Date of Patent: Jan. 6, 2009

(54) PRINTING APPARATUS AND METHOD OF DISPLAYING EXPLANATIONS OF PRINTING APPARATUS

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 974 days.

(21) Appl. No.: 10/775,821

(22) Filed: Feb. 10, 2004

(65) Prior Publication Data

US 2004/0212813 A1 Oct. 28, 2004

(30) Foreign Application Priority Data

Mar. 26, 2003 (JP) ............................. 2003-084955

(51) Int. Cl.
*G06F 3/12* (2006.01)
(52) U.S. Cl. ...................... 358/1.13; 358/1.14; 358/296; 345/534; 345/156; 400/83
(58) Field of Classification Search ............... 358/1.13, 358/296; 345/534, 156; 400/83
See application file for complete search history.

(56) References Cited

U.S. PATENT DOCUMENTS

| | | | | |
|---|---|---|---|---|
| 4,899,276 A | * | 2/1990 | Stadler | 715/705 |
| 5,388,251 A | * | 2/1995 | Makino et al. | 714/57 |
| 5,609,424 A | * | 3/1997 | Sakuragi et al. | 400/61 |
| 5,651,619 A | * | 7/1997 | Nunokawa et al. | 400/83 |
| 5,885,012 A | * | 3/1999 | Hastings et al. | 400/83 |
| 6,092,947 A | * | 7/2000 | Nunokawa et al. | 400/615.2 |
| 6,115,024 A | * | 9/2000 | Hayama | 345/23 |
| 6,384,922 B1 | * | 5/2002 | Hayama et al. | 358/1.13 |
| 2003/0218773 A1 | * | 11/2003 | Kurashina | 358/1.16 |
| 2005/0007606 A1 | * | 1/2005 | Miyasaka | 358/1.1 |
| 2005/0057761 A1 | * | 3/2005 | Sakai et al. | 358/1.2 |

FOREIGN PATENT DOCUMENTS

| | | |
|---|---|---|
| CN | 238450 | 1/1995 |
| CN | 460834 | 10/2001 |

* cited by examiner

*Primary Examiner*—Twyler L Haskins
*Assistant Examiner*—Jacky X Zheng
(74) *Attorney, Agent, or Firm*—Hogan & Hartson LLP

(57) ABSTRACT

A printer specifies at least one arbitrary option out of a plurality of options displayed on a display screen as a tentative option, determines the tentative option as a determined option (determinate option), and performs printing based on the determinate option. When a handling explanation is requested before the determination, display is switched to display of the handling explanation from option display. A user can therefore easily and quickly view the handling explanation at once during operations.

8 Claims, 13 Drawing Sheets

FIG. 12A    G20

CONTINUOUS PRINTING ◆
  THE SAME LABEL WILL BE CONTINUOUSLY PRINTED UP
TO 100 PIECES. IF YOU WANT TO STOP PRINTING IN
THE MIDDLE THEREOF, PRESS [DELETE].

FIG. 12B    G21

CONTINUOUS PRINTING ◆ (SPECIAL PRINTING BUTTON)
  THE SAME LABEL WILL BE CONTINUOUSLY PRINTED UP
TO 100 PIECES. IF YOU WANT TO STOP PRINTING IN
THE MIDDLE THEREOF, PRESS [DELETE].
- - - - - - - - - - - - - - - - - - - - - - - - - - - - - - - - - - - -
THE NUMBER OF PAGES PRINTED ONCE IS SAVED IN DATA
IT IS CONVENIENT TO COMBINE WITH SEQUENCE FUNCTION

FIG. 12C    G22

CONTINUOUS PRINTING ◆ (SPECIAL PRINTING BUTTON)
  THE SAME LABEL WILL BE CONTINUOUSLY PRINTED UP
TO 100 PIECES. IF YOU WANT TO STOP PRINTING IN
THE MIDDLE THEREOF, PRESS [DELETE].
- - - - - - - - - - - - - - - - - - - - - - - - - - - - - - - - - - - -
YOU CAN SELECT ONE OF
"UNTIL STOPPED": CONTINUOUS PRINTING UP TO 100 PIECES
"NOT PERFORMED": CANCEL CONTINUOUS PRINTING
"2 PIECES IN SUCCESSION": CONTINUOUS PRINTING FOR 2 PIECES
"3 PIECES IN SUCCESSION": CONTINUOUS PRINTING FOR 3 PIECES

PRINTING APPARATUS AND METHOD OF DISPLAYING EXPLANATIONS OF PRINTING APPARATUS

BACKGROUND OF THE INVENTION

1. Field of the Invention

This invention relates to a printing apparatus which displays handling explanations of printing, such as selectable various functions and operation methods relating to printing, on a display screen and the like. This invention also relates to a method of displaying explanations of a printing apparatus, a program and a storage medium.

2. Description of the Related Art

In a word processor or a printing apparatus such as a tape printer, there are cases where questions about "handling" of the device arise, such as that a user does not know how to operate from a currently displayed screen, a tool bar and the like (hereinafter simply referred to as a "display screen") or that the user does not know meanings of displayed various options. In order to respond to the above cases, a method of displaying a so-called help screen (as another window screen or the like) in a side-by-side relationship with an original screen, such as a text editing screen or the like, has been known. Specifically, on the help screen, explanations having the same contents as those of an "explanation manual" (manual) (hereinafter also referred to as "handling explanations") are searched with keywords and the like and displayed by pressing a help key provided on a keyboard and the like, by clicking a help in a tool bar displayed on a screen, or the like. There has been also known a method of automatically displaying (automatic display of) a function explanation off an option on which a cursor or a mouse pointer is positioned (a pointed option) in a side-by-side relationship with the option in a part of an original screen. There has been made a device which enables a series of operations on a guidance screen serving also as a help screen not by using an original screen but by switching to the guidance screen and displaying options, a function explanation thereof, and operating explanations from that state in a side-by-side relationship in a display of the guidance screen.

However, in the above-described method of automatic display of the function explanation, the function explanation is automatically displayed in a single uniform way even when no explanation is necessary. Thus, the time spent in the automatic display is wasted. Overlapping of displayed function explanation on a display of an original operation screen makes operations difficult. In order to avoid the above problem, a display screen sufficiently large to display options and function explanation thereof in a side-by-side relationship is required. In the above-described method using the help screen, the guidance screen or the like, the original screen and the help screen are displayed in a side-by-side relationship in a displayed screen or the options, the function explanation, and the operating explanations are displayed in a side-by-side relationship on the guidance screen. Thus, a much larger display screen is required. Furthermore, the methods described above involve effort to search for target handling explanations, similar to the "handling manual", such as searching with keywords and the like or performing a list display. Consequently, in some cases, trouble arises in work (operations) such as text editing.

SUMMARY OF THE INVENTION

It is an advantage of this invention to provide a printing apparatus capable of easy and quick display of handling explanations, as the need arises, at once during operations without searching and the like even if a display screen is small. The object of this invention is also to provide a method of displaying explanations of a printing apparatus, a program and a storage medium.

According to this invention, there is provided a printing apparatus having: display means capable of option display in which a plurality of options related to printing are displayed on a display screen; tentative option designating means for designating at least one arbitrary option out of the plurality of options as a tentative option on the display screen; selection determination means for determining the tentative option as a determinate option; and print means for printing based on the determinate option. The printing apparatus comprises: explanation requesting means capable of requesting, before the determination, a handling explanation including at least one of an operating explanation for guiding a next operation from a state of the option display and a function explanation for explaining a function of the tentative option; and display switching means for switching, when the handling explanation is requested, display of the display screen from the option display to explanation display that is display of the handling explanation.

According to this arrangement, at least one arbitrary option out of the plurality of options displayed on the display screen (option display) is designated as a tentative option and the tentative option is determined as a determined option (determinate option). Accordingly, printing is performed based on the determinate option. In this printing apparatus, according to a request for the handling explanations before the determination, the option display is switched to display of the handling explanations (explanation display). Thus, a user can easily and quickly view the handling explanations at once during operations. In this case, the handling explanations include: an operating explanation for guiding to a next operation from the state of the option display; and function explanations for explaining or describing functions when the tentative option is determined as it is (to be the determinate option). Thus, even if the user has no "handling or operating manual" in hand, he/she can easily and quickly grasp a next operation method and the function of the tentative option at once. In this case, since the displays are switched between one another, the printing apparatus requires a display screen smaller than that for displaying the option display and the explanation display in a side-by-side relationship. Since the display is switched between one another when the handling explanation is requested from the state of the option display in which the tentative option exists, an object of the explanation request is clear enough. Consequently, the next operation method, the functions of the tentative option and the like can be subjected to the explanation display without searching with keywords and the like. The handling explanation is displayed when requested (i.e., when required). Thus, operation efficiency is not lowered by unnecessary explanation displays. Therefore, the user can easily and quickly view the handling explanations, as the need arises, at once during the operations without searching and the like even if the display screen is small.

Preferably, a plurality of display modes are defined inclusive of an option display mode for commanding the option display, and an explanation display mode for commanding the explanation display. The explanation requesting means requests the handling explanation by switching from the option display mode to the explanation display mode. The display switching means allows the display screen to perform the option display in the option display mode and the display of the handling explanation in the explanation display mode.

According to this arrangement, the plurality of display modes including the option display mode and the explanation display mode are defined and displays are performed in accordance with the display modes. Thus, only by switching from the option display mode to the explanation display mode, the handling explanation can be requested. The user can easily and quickly view the handling explanation at once during the operations without searching and the like even if the display screen is small.

Preferably, the explanation requesting means is key operation means for alternately switching between the option display mode and the explanation display mode by operating an identical key.

According to this arrangement, the option display mode and the explanation display mode are alternately switched between one another by operating the identical (or single) key. Thus, requesting and viewing of the handling explanations and returning to an original display can be easily and quickly performed.

Preferably, the printing apparatus further comprises explanation printing commanding means for commanding explanation printing in which the handling explanation is printed by the print means before the determination.

According to this arrangement, in addition to displaying of the handling explanations (the explanation display), printing of the handling explanations (explanation printing) can be performed. When the display screen is small, displayable information included in the handling explanation is limited. However, more information (explanations) can be displayed since printing is made possible.

According to another aspect of this invention, there is provided a printing apparatus having: display means capable of option display in which a plurality of options related to printing are displayed on a display screen; tentative option designating means for designating at least one arbitrary option out of the plurality of options as a tentative option on the display screen; selection determination means for determining the tentative option as a determinate option; and print means for printing based on the determinate option. The printing apparatus comprises: explanation requesting means capable of requesting, before the determination, a handling explanation including at least one of an operating explanation for guiding a next operation from a state of the option display and a function explanation for explaining a function of the tentative option; and explanation printing commanding means for commanding explanation printing in which the handling explanation is printed by the print means when the handling explanation is requested.

According to this arrangement, the explanation printing can be performed instead of the explanation display. This printing apparatus can thus be also applied to a printing apparatus which has an extremely small display screen and which cannot perform the explanation display. Consequently, more handling explanations can be displayed.

Preferably, the object to be printed in the explanation printing is one which can be attached to an object of attachment through an adhesive surface.

According to this arrangement, the printing apparatus can be utilized in such a manner that the object to be printed, on which, e.g., handling explanations of frequently-used functions are printed is attached to a printing apparatus main body, office supplies on hand and the like so as to be referred to constantly. Thus, convenience thereof is improved. The printing apparatus can be applied to a tape printing apparatus by using a tape as the object to be printed.

According to still another aspect of this invention, there is provided a method of displaying explanations of a printing apparatus which displays a plurality of options related to printing on a display screen, specifies at least one arbitrary option as a tentative option, determines the tentative option as a determinate option, and performs printing based on the determinate option. The method comprise: an explanation requesting step capable of requesting, before the determination, a handling explanation including at least one of an operating explanation for guiding a next operation from a state of option display, in which the plurality of options are displayed, and a function explanation for explaining a function of the tentative option; and an explanation executing step of executing one of a display switching step of switching display of the display screen from the option display to display of the handling explanation when the handling explanation is requested, and an explanation printing step of printing the handling explanation on an object to be printed.

The explanation display method described above is a method of displaying handling explanations in a printing apparatus which specifies at least one arbitrary option out of the plurality of options displayed on the display screen (the option display) as a tentative option, determines the tentative option as a determinate option, and performs printing based on the determinate option. In this explanation display method, when the handling explanations are requested before the determination, display of the handling explanations (explanation display) or printing (explanation printing) is performed. In this case, the handling explanations include the operating explanation from the option display, and the function explanation of the tentative option. Thus, even if a user has no "explanation manual" in hand, he/she can easily and quickly grasp the next operation method and the functions of the tentative option at once by reading the explanations. In the explanation display, the display is switched from the option display. Thus, the printing apparatus requires a display screen smaller than that for displaying the option display and the explanation display in a side-by-side relationship. In the explanation printing, it is possible to display more information (explanations) than those included in explanation display on a small display screen. Since the handling explanations are requested from the state of the option display in which the tentative option exists, the next operation method, the functions of the tentative option and the like can be displayed without searching and the like. Further, since the handling explanations are displayed when requested (when required), operation efficiency is not lowered by unnecessary processing. Therefore, the user can easily and quickly view the handling explanations, as the need arises, at once during the operations without searching and the like even if the display screen is small.

According to another aspect of this invention, there is provided a program for causing to function each of the means of the printing apparatus.

According to still further aspect of this invention, there is provided a program for executing the method of displaying explanations of the printing apparatus.

According to the above arrangement, the program is processed by the printing apparatus capable of program processing. Thus, the user can easily and quickly view the handling explanations at once during the operations without searching and the like even if the display screen is small.

According to still another aspect of this invention, there is provided a storage medium for storing the program as described above so as to be readable by a printing apparatus which is capable of program processing.

In the printing apparatus capable of program processing, the program stored in the storage medium described above is read and executed. Thus, the user can easily and quickly view the handling explanations at once during the operations without searching and the like even if the display screen is small.

BRIEF DESCRIPTION OF THE DRAWINGS

The above and other objects and the attendant features of this invention will become readily apparent by reference to the following detailed description when considered in conjunction with the accompanying drawings wherein:

FIGS. 12A to 12C are explanatory views showing examples of printing results obtained by help printing instructed from the state of FIG. 11 or FIG. 13.

DETAILED DESCRIPTION OF THE PREFERRED EMBODIMENTS

With reference to the accompanying drawings, a tape printer according to one embodiment of this invention will be described below in detail.

Figure 1:
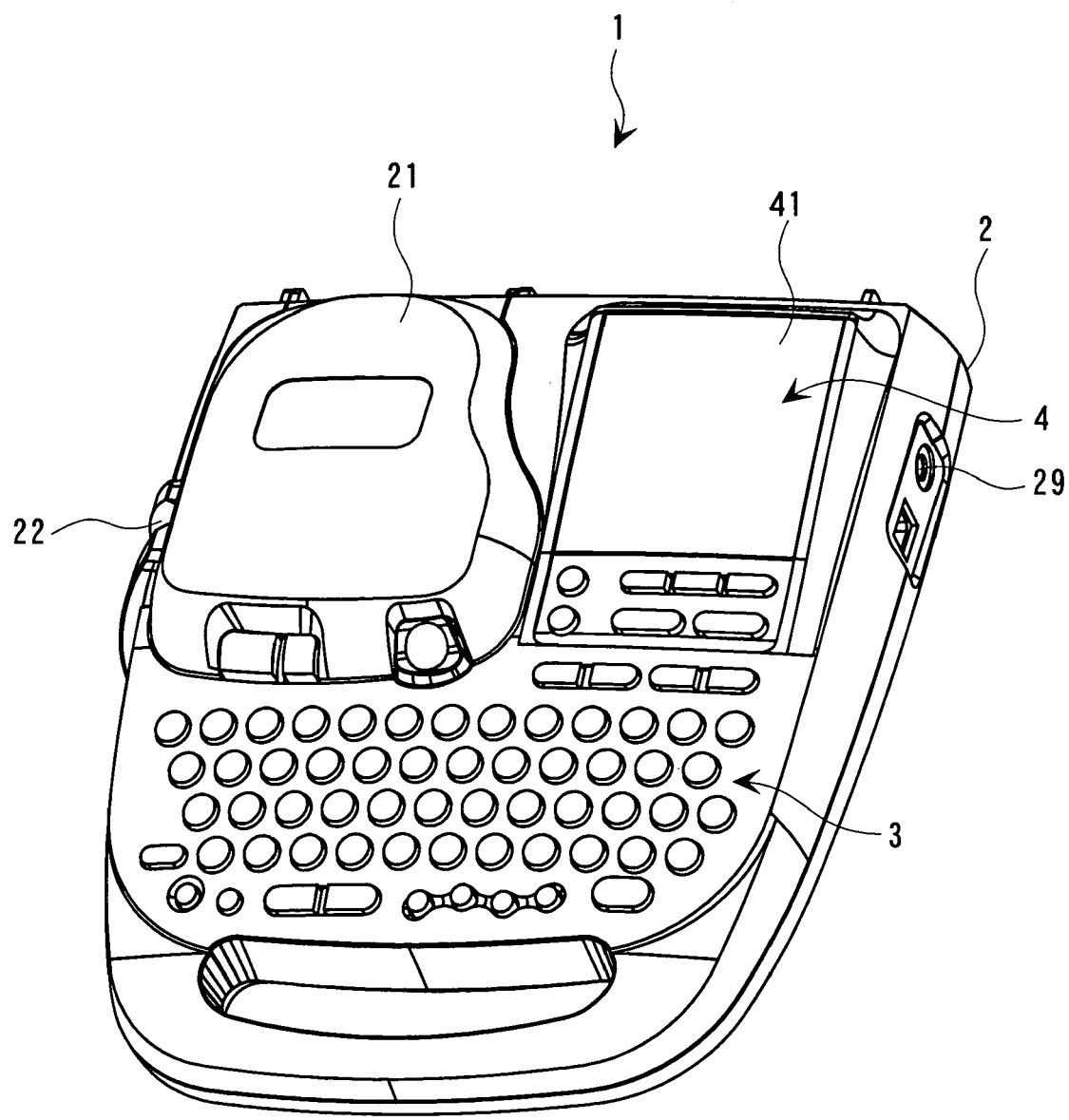
FIG. 1 is an external perspective view of a tape printing apparatus according to one embodiment of this invention.
Figure 2:
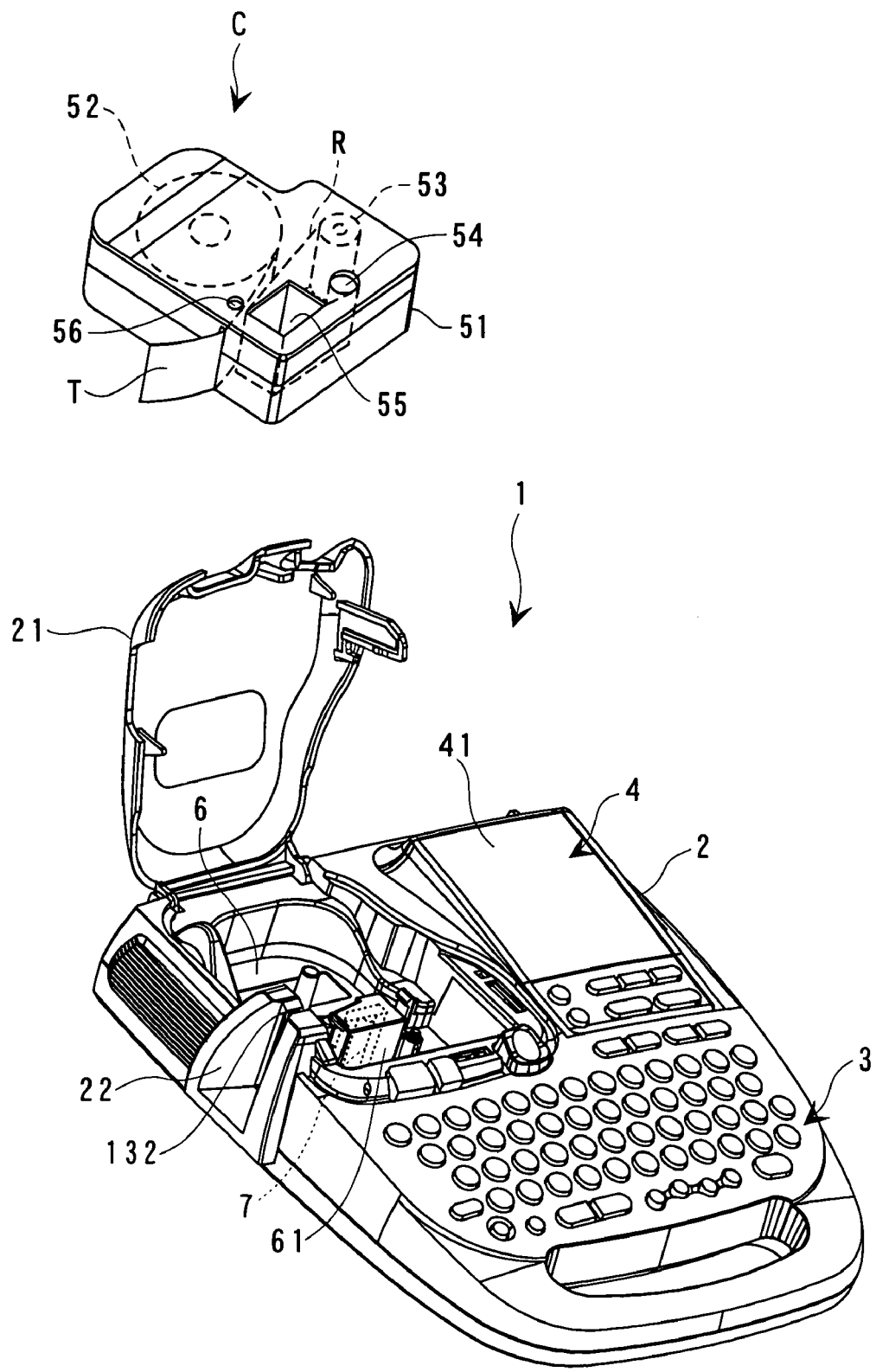
FIG. 2 is a perspective view thereof in a state in which a cover thereof is opened.

As shown in FIGS. 1 and 2, the tape printer (tape printing apparatus) 1 has its external shape formed by a printer case (printer main body) 2. In an upper front portion of the printer case 2, a keyboard 3 including various input keys is provided. In an upper rear portion of the printer case 2, an opening and closing cover 21 is fitted to its left portion, and a display 4 is provided in its right portion. In a left side portion of the printer case 2, a slit-shaped tape ejection opening 22 is formed, which connects a pocket (tape mounting part) 6 with the outside of the printer. A tape cutter 132, which cuts a printing tape (hereinafter simply referred to as a "tape") T that is ejected, is disposed to face this tape ejection opening 22.

Figure 3:
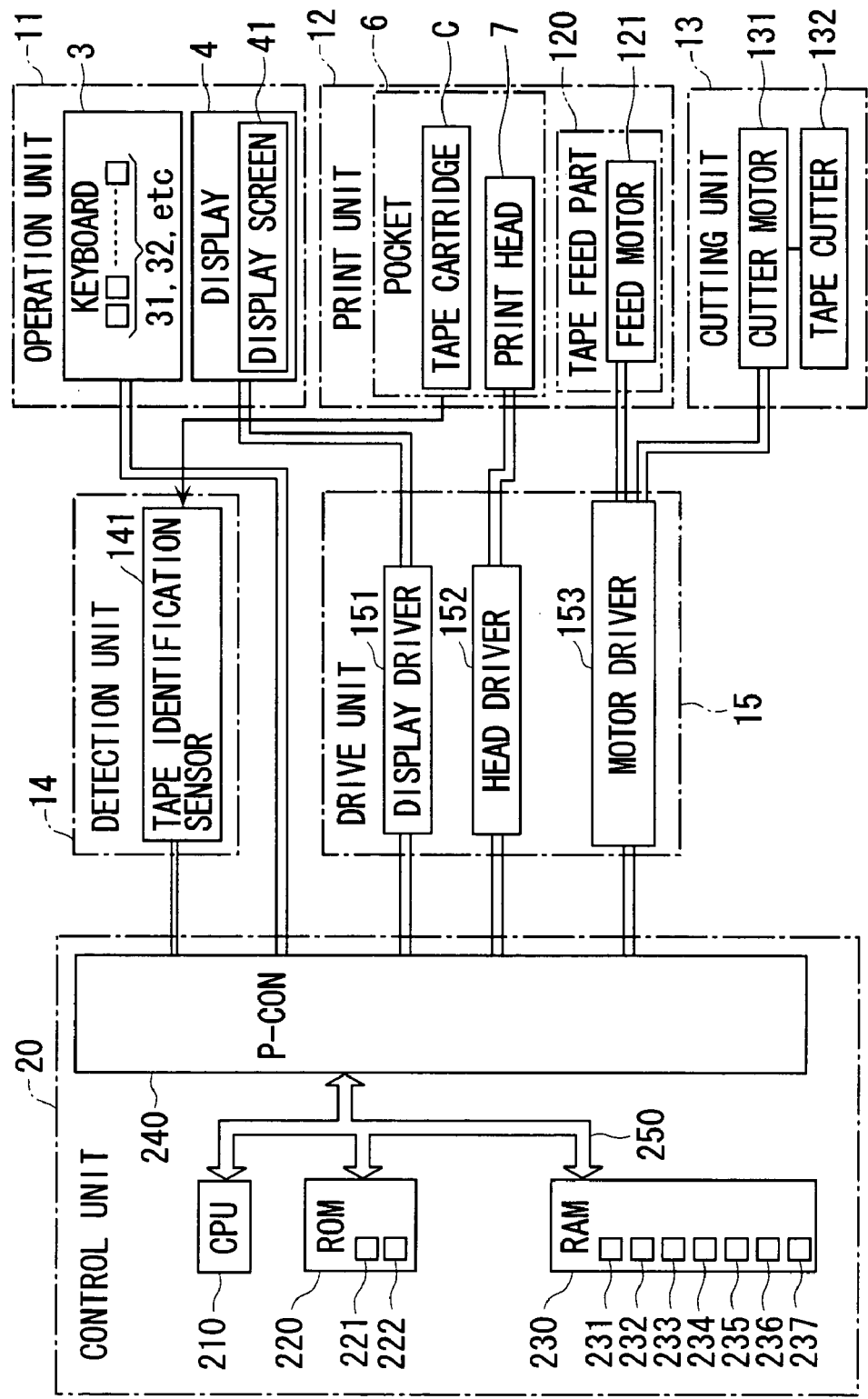
FIG. 3 is a block diagram schematically showing a control system thereof.

FIG. 3 shows a basic arrangement of the tape printer 1 as seen from the viewpoint of a control system. The tape printer 1 is made up of: an operation unit 11 which has the keyboard 3 and the display 4 and serves as an interface between the printer and a user; a print unit 12 which has a print head (thermal head) 7 and a tape feed part 120 and performs printing on the tape T of a tape cartridge C mounted in the pocket 6; a cutting unit 13 which cuts the printed tape T; a detection unit 14 which has various sensors and performs various detections; a drive unit 15 which has various drivers and drives respective parts; and a control unit 20 which controls the respective parts in the tape printer 1. Accordingly, in the printer case 2, a circuit board (not illustrated) is housed, aside from the print unit 12, the cutting unit 13, the detection unit 14 and the like. On this circuit board, aside from a power supply unit, respective circuits of the drive unit 15 and the control unit 20 and the like are mounted. The respective circuits are connected to an AC adaptor connection port 29 or a battery (not illustrated) that is detachable from the outside.

In the tape printer 1, after mounting the tape cartridge C in the pocket 6, the user inputs print information such as desired characters (characters such as letters, numbers, symbols, simplified figures and the like) by using the keyboard 3 while confirming input and editing results on the display 4 and instructs printing. Accordingly, the tape T is let out from the tape cartridge C by the tape feed part 120 and desired printing is performed on the tape T by the print head 7. Thereafter, the printed part of the tape is sent to the outside from the tape ejection opening 22. When the desired printing is completed, the tape feed part 120 feeds the tape T to a position of a tape length including margins and, thereafter, stops the feed.

As shown in FIGS. 2 and 3, in the print unit 12, the pocket 6 for mounting the tape cartridge C is provided in the opening and closing cover 21. The tape cartridge C is attached to, and detached from, the pocket 6 in a state in which the opening and closing cover 21 is opened. On a back of the tape cartridge C, a plurality of small holes (not illustrated) are provided so that types of the tape T, which are different from one another in width and the like, can be identified. In the pocket 6, a tape identification sensor 141, such as microswitches, for detecting the presence or absence of these holes is provided. Thus, it is possible to detect the presence of the tape T (strictly speaking, whether or not the tape cartridge C is mounted) and the type of the tape T (strictly speaking, a type of the tape cartridge C).

In the tape cartridge C, the tape T having a certain width (about 4.5 mm to 48 mm) and an ink ribbon R are housed in a cartridge case 51, and a through-hole 55, to which the print head 7 faces, is formed. The tape T has an adhesive surface formed on its back and the adhesive surface is covered with release paper. In a portion in which the tape T and the ink ribbon R overlap with each other, a platen roller (platen) 56 is housed so as to correspond to the print head 7 built in a head unit 61. In a state in which the tape cartridge C is mounted, the print head 7 contacts a back of the ink ribbon R exposed from the through-hole 55 and is heated and driven to print desired characters and the like on a surface of the tape T.

The tape feed part 120 is disposed in a space extending from the side of the pocket 6 to the lower side thereof and includes a feed motor 121 as a source of power (drive). When the tape cartridge C is mounted in the pocket 6 and the opening and closing cover 21 is closed in this state, the tape T is let out (or fed) from a tape reel 52, and the ink ribbon R is let out from a ribbon letting-out reel 53 by using the feed motor 121 as the source of drive. Thereafter, the tape T and the ink ribbon R are sandwiched between the print head 7 and the platen 56 at the position of the through-hole 55 and are brought into abutment with the platen 56. Accordingly, the tape T and the ink ribbon R travel in a state of overlapping with each other. In synchronization therewith, the print head 7 is driven to perform printing. Thereafter, the ink ribbon R is taken up by a ribbon take-up reel 54 in the tape cartridge C and only the tape T is ejected to the outside of the tape cartridge C. Subsequently, the platen 56 is continuously rotated (the ribbon take-up reel 54 is rotated in synchronization therewith) for a predetermined period of time. Thus, tape feed of the tape T is continued, the tape is sent to the outside of the printer through the tape ejection opening 22, and a predetermined cutting position on the tape T is sent to a position of the tape cutter 132.

The cutting unit 13 includes the tape cutter 132 and a cutter motor 131 for allowing the tape cutter 132 to perform a cutting operation. The cutting unit 13 can be switched between automatic and manual modes by mode setting. In a case of arbitrary length printing or the like, the cutter motor 131 is driven by manually operating a cut key. In a case of fixed length printing or the like, the cutter motor 131 is driven automatically. The detection unit 14 includes various sensors and the like in the respective parts of the printer, aside from the above-described tape identification sensor 142. The drive unit 15 includes a display driver 151, a head driver 152 and a motor driver 153. Based on a control signal outputted from the control unit 20, the display driver 151 drives the display 4 of the operation unit 11 according to an instruction of the control signal. Similarly, the head driver 152 drives the print head 7 of the print unit 12 and the motor driver 153 drives the various motors such as the feed motor 121 of the print unit 12 and the cutter motor 131 of the cutting unit 13.

The operation unit 11 includes the keyboard 3 and the display 4. The display 4 includes, in a rectangular shape of about 6 cm in a horizontal direction (X direction)×4 cm in a vertical direction (Y direction): a display screen 41 capable of displaying display image data of 96 dots×64 dots; and eighteen indicators (not illustrated) for displaying various setting conditions and the like. The display 4 is used when the user inputs data from the keyboard 3 to create/edit print image data such as character string image data, when the user views results and the like of the created/edited data, when the user inputs various command/selection instructions and the like from the keyboard 3, or the like.

In the keyboard 3, a function key group 32 for specifying various operation modes and the like is arranged, aside from a character key group 31 including an alphabet key group, a numeric key group, a kana key group such as hiragana and katakana, an external character key group for calling up and selecting external characters, and the like.

In the function key group 32, included are: a power key; a print key for commanding (or instructing) a print operation; a selection key for data determination or line feed in text input and for commanding selection of various modes in a selection screen; a cancel key for canceling various operations; a deletion key for terminating various processing or deleting determined characters and the like according to need; a cut key for the manual cut described above; four cursor keys for moving a cursor from side to side and up and down, respectively, or moving a display range of the display screen 41. The function key group 32 includes: a special print key for commanding special printing to be described later; HELP keys (a HELP display key and a HELP print key) for displaying various handling explanations or manuals; and the like. The functions described above may be inputted by providing keys separately for each key input or may be inputted by combining the keys with a shift key or the like and using fewer keys. The keyboard 3 inputs various explanations and data to the control unit 20 by using the various keys described above.

The control unit 20 includes a CPU 210, a ROM 220, a RAM 230 and a peripheral control circuit (P-CON) 240, which are connected to each other through an internal bus 250. Besides a control program region 221 for storing control programs processed by the CPU 210, the ROM 220 has a control data region 222 for storing font data of characters and the like (including numbers, symbols, figures and the like) which are prepared in the printer, a color conversion table, a character modification table and the like. The RAM 230 is backed up when the power is off and includes regions such as: various flag and register groups 231; a text data region 232; a display image data region 233; a print image data region 234; a drawing registration image data region 235; an external character registration image data region 236; and various buffer regions 237 such as a character development buffer and a print buffer. The RAM 230 is used as a work space of various processing.

In the P-CON 240, there are built in: a logic circuit for supplementing functions of the CPU 210 and handling an interface signal with peripheral circuits; a function circuit such as a timer performing various clocking; and the like. Specifically, the circuits described above are arranged by using a gate array, a custom LSI and the like. Thus, the P-CON 240 is connected to the various sensors of the detection unit 14 and the keyboard 3 and fetches various detection signals, various commands, input data and the like, directly or after being processed, into the internal bus 250. At the same time, in conjunction with the CPU 210, the P-CON 240 outputs data and control signals, which are outputted to the internal bus 250 from the CPU 210 and the like, directly or after being processed, to the drive unit 15.

Accordingly, with the configuration described above, the CPU 210 controls the entire tape printer 1. For example, the CPU 210 inputs various detection signals, various explanations, various data and the like through the P-CON 240 according to the control program in the ROM 220. Thereafter, the CPU 210 processes various data and the like in the ROM 220 and the RAM 230 and outputs a control signal to the drive unit 15 through the P-CON 240. Thus, control of print position, display control of the display screen 41 and the like are performed by the CPU 210. At the same time, the CPU 210 controls the print head 7 to print on the tape T under predetermined print conditions.

Figure 4:
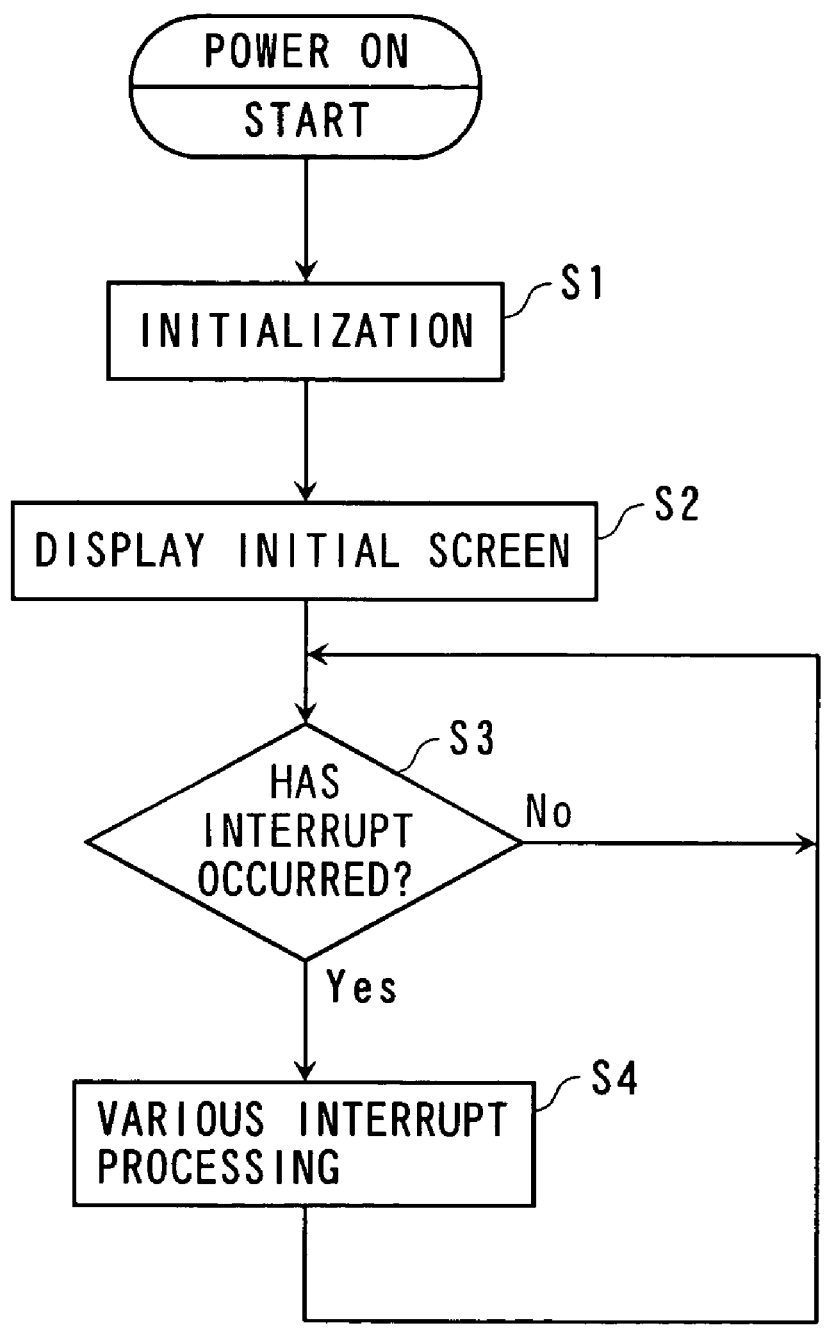
FIG. 4 is a flowchart schematically showing processing of entire control thereof.

Next, with reference to FIG. 4, description will be given of a processing flow of the entire control of the tape printer 1. When the processing is started by pressing the power key (turning on power), as shown in FIG. 4, first, initialization such as restoration of respective saved control flags is performed in order to return to a previous state in which the power is off (S1). Next, a previous display screen is displayed as an initial screen (S2).

The processing following after the above steps in FIG. 4, that is, determination branching whether or not key input is performed (S3) and various interrupt processing (S4) are conceptual processing. In reality, in the tape printer 1, after finishing the display of the initial screen (S2), interrupt by key input and the like is permitted and the current state is maintained as it is until some kind of interrupt occurs (S3: No). When some kind of interrupt occurs (S3: Yes), the processing moves to respective interrupt processing (S4). After finishing the interrupt processing, the state is maintained again (S3: No).

As described above, in the tape printer 1, the processing is mainly performed by the interrupt processing. Thus, if the tape printer 1 is ready for print image creation and the like, the user presses the print key at an arbitrary point of time. Accordingly, print processing interrupt occurs and print processing is started. Thus, a print image can be printed based on print image data. Namely, the operating procedure up to printing can be selected arbitrarily by the user.

Figure 5A:
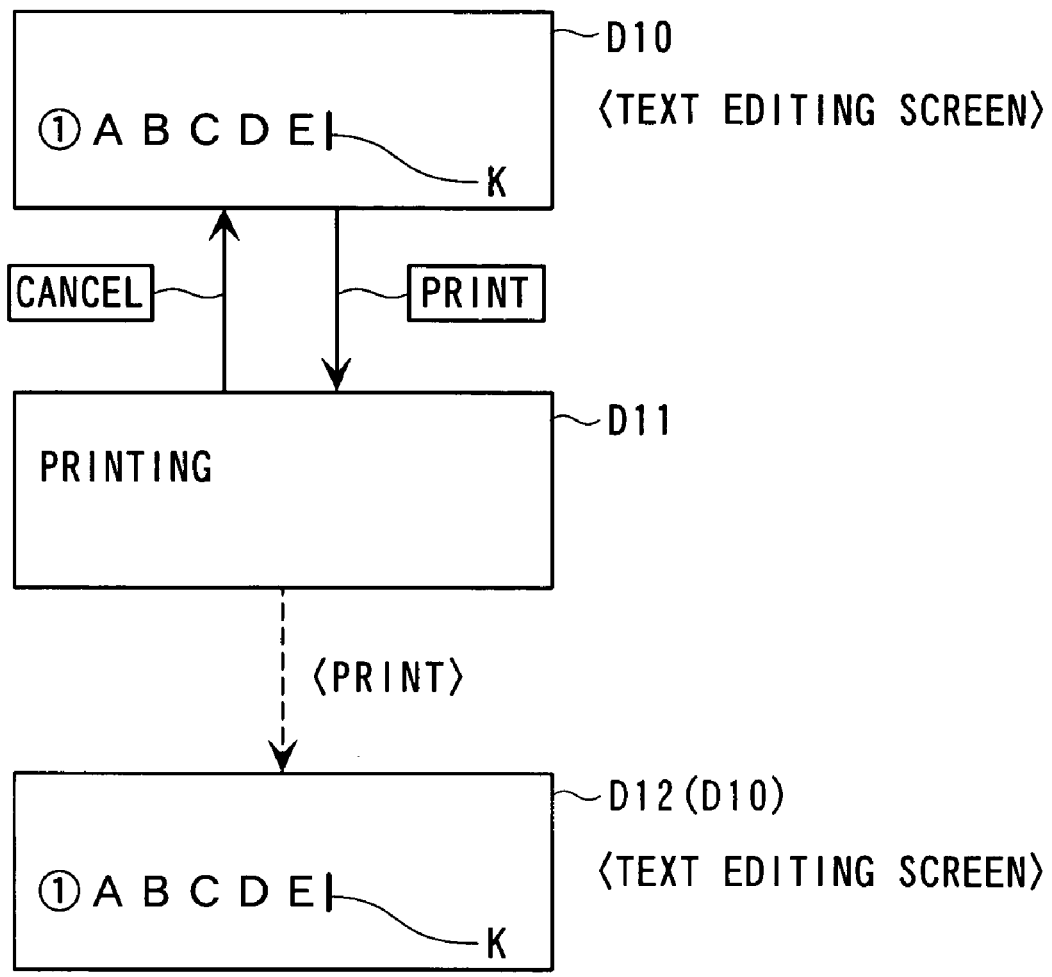
FIG. 5A is an explanatory view of display screens and typical operations on the display screens, showing one example in printing.
Figure 5B:
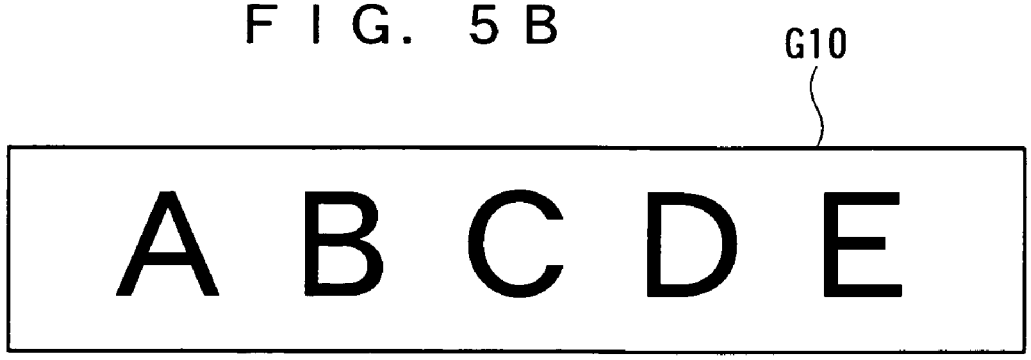
FIG. 5B is an explanatory view showing one example of a printing result obtained by the printing of FIG. 5A.

For example, as shown in FIG. 5A, in a state of displaying a text editing screen (screen D10) after inputting a character string "ABCDE" of a first line up to a cursor K, when the user presses the print key, a message of "printing" is displayed and a character string image of the character string "ABCDE" is printed as a print image G10 (FIG. 5B) (D11). After the printing is finished, the display is returned to the original text editing screen (D12: the same as D10). In the tape printer 1, the user can cancel various explanations by key input by using the cancel key. Accordingly, by pressing the cancel key from the above-described state (D11), the display can be returned to the state of displaying the original text editing screen (D10).

In the tape printer 1, even if the user has no "explanation manual" (manual) in hand and even if the display screen is small as shown in the drawing, the user can easily and quickly view "handling explanations" for various functions and operation methods at once during operations without searching and the like. By taking the case of "special printing" as an example, a first embodiment will be described below.

Figure 6:
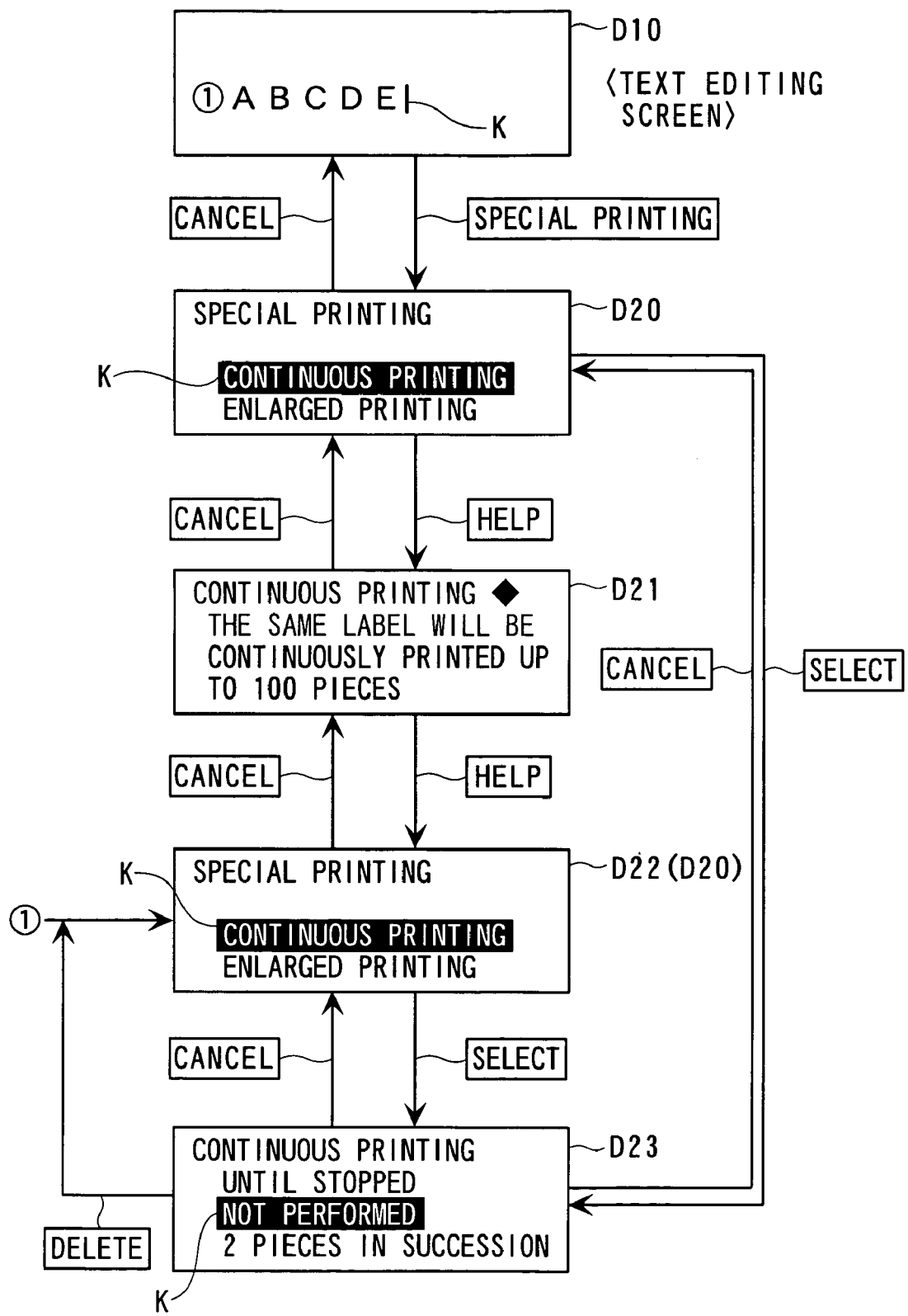
FIG. 6 is an explanatory view of display screens and typical operations on the display screens, showing one example of performing help display in the course of an operation of selecting and setting special printing.

In the tape printer 1 of this embodiment, as shown in FIG. 6, when the user presses the special print key, for example, from the state of the text editing screen described above (D10), options of a selection screen in the first hierarchy of the "special printing" are displayed (D20). The options in this screen include "continuous printing", "enlarged printing", "mirror image printing" and the like. One of the options, which is designated by the cursor K and highlighted (displayed by the negative), is displayed in a state of being a selection candidate (hereinafter referred to as "selection display").

Here, in specifications, immediately after screen transition, a previously selected option (that is an option of a most recent access and is a default option when there is no corresponding option) is subjected to the selection display (D20). The example of FIG. 6 shows a state in which "continuous printing" is subjected to the selection display (that is, the state of being the selection candidate which is equal to a state of being tentatively selected and an option in this state will be hereinafter referred to as a "tentative option").

However, from the above-described state (D20), the user can subject another option to the selection display (to obtain the tentative option) by a cursor operation. Accordingly, if the user subjects "enlarged printing" to the selection display (to obtain the tentative option) by the cursor operation and, thereafter, presses the selection key, "enlarged printing" can be selected to be determined (an option determined by pressing the selection key will be hereinafter referred to as a "determinate option"). If the selection key is pressed in the state in which "continuous printing" is the tentative option, "continuous printing" can be set as the determinate option. In this case, the screen moves (screen transition) directly to a selection screen (D23) to be described later.

As shown in FIG. 6, if the user presses the HELP key from the state in which "continuous printing" is the tentative option (D20), a function explanation of "continuous printing" as the tentative option, in other words, an explanation (message) to the effect that "the same label will be continuously printed up to 100 pieces" is displayed as a handling explanation (help display) (D21). The mark "♦" shown in the drawing is a mark indicating that the statement made below the mark is the "handling explanation" (hereinafter referred to as a "doctor mark" or a "help mark").

From the state of the help display described above (D21), the screen can be returned to the original selection screen by pressing the HELP key again (D22: the same as D20). Here, assuming that the selection key is pressed as the tentative option is still "continuous printing", "continuous printing" is set as the determinate option and options of a selection screen in a lower hierarchy (the second hierarchy) of "continuous printing" are displayed (D23: common in FIGS. 6 and 7).

The options in this screen include: "until stopped" indicating that a predetermined print image (in this example, a character string image to be a label of the character string "ABCDE") is continuously printed until stopped by pressing the cancel key or the deletion key (however, up to a maximum of 100 pieces); "not performed" indicating that the continuous printing is not performed; "2 pieces in succession (or 2 pieces in rapid succession)" indicating that only 2 pieces are continuously printed; "3 pieces in succession (or 3 pieces in rapid succession)" indicating that 3 pieces are continuously printed; and the like. Here, it is assumed that there is no most recent access and "not performed" of default is subjected to the selection display (set as the tentative option).

Figure 7:
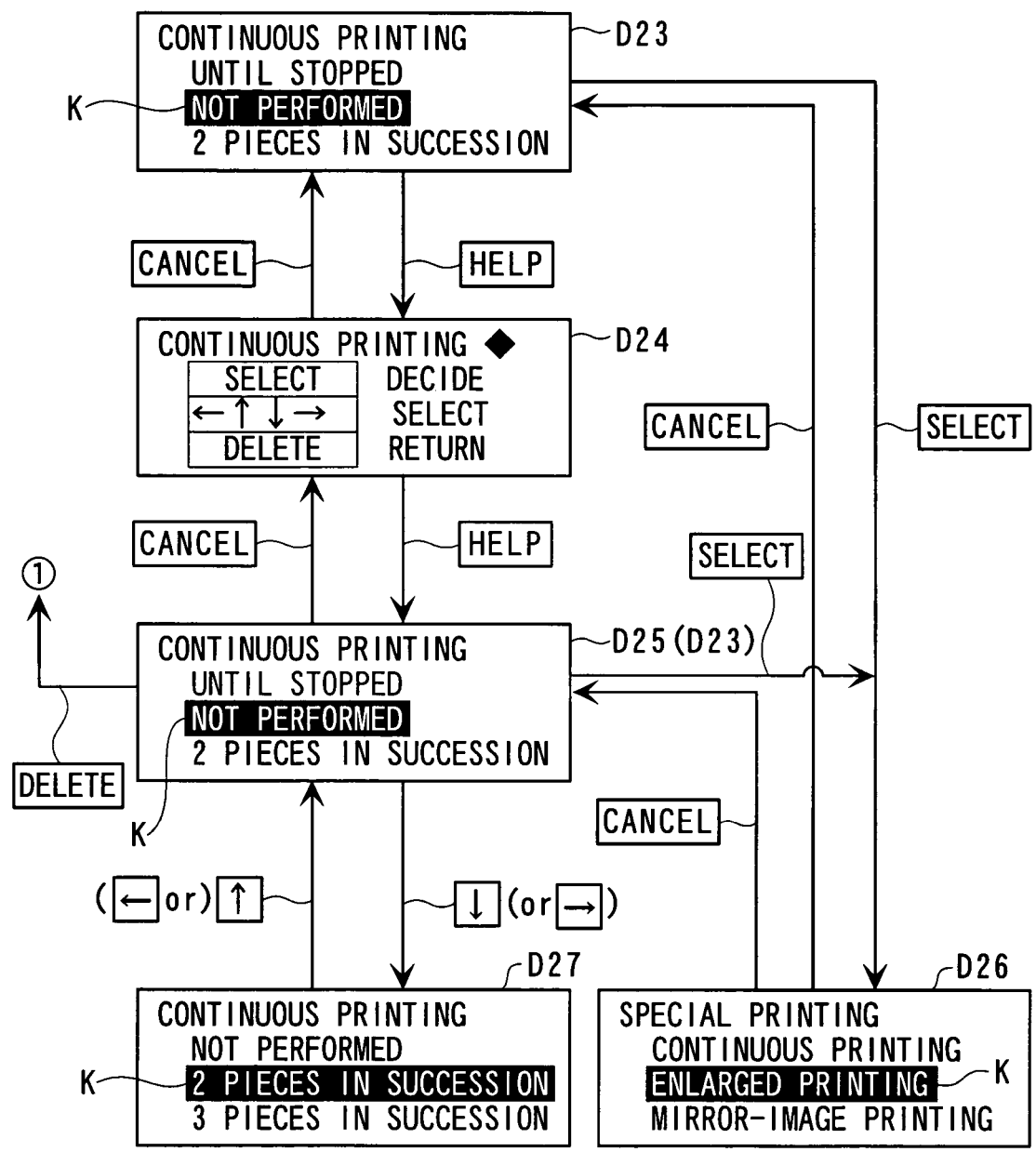
FIG. 7 is an explanatory view following FIG. 6, similar thereto.

As shown in FIG. 7, if the HELP key is pressed in the state described above (D23), not a function explanation of the tentative option "not performed" but operating explanations for an operation method from the foregoing selection screen in the second hierarchy are subjected to help display here as the handling explanations (D24). In other words, as shown in FIG. 7, the following operating explanations are subjected to the help display, e.g., an explanation to the effect: that the option can be determined ("decided") by pressing the "selection" key; that the option (the tentative option) can be changed ("selected") by using the various cursor keys ("←", "↑", "↓" and "→"); that the screen can be returned to the original screen (the selection screen in the upper first hierarchy) by pressing the "deletion" key; and the like.

When the HELP key is pressed again in the state of the help display described above (D24), the screen returns to the original selection screen in the second hierarchy (D25: the same as D23).

From this state (D25), as described in the handling explanations of the foregoing help display (D24), if the selection key is pressed, the tentative option "not performed" is "decided" as the determinate option. Thereafter, the screen moves (transits) to the selection screen of the upper first hierarchy (assuming, however, that the next option "enlarged printing" is set as the tentative option) (D26). If the cursor key "↑" (or "←") is pressed, the upper (top) option "until stopped" is set as the tentative option. On the contrary, if the cursor key "↓" (or "→") is pressed, the lower (bottom) option "2 pieces in succession" is set as the tentative option (D27). In such a manner, the tentative option can be "selected". When the "deletion" key is pressed, the screen is "returned" to the original selection screen in the first hierarchy (to D22 of FIG. 6 through ① shown in FIG. 7).

As described above, in the tape printer 1, an arbitrary option among a plurality of options displayed in the selection screen (option display) is specified as a tentative option by using the cursor. Thereafter, the tentative option is determined as a determinate option (a determined option) by pressing the selection key. For example, in FIG. 6, from the selection screen (D20) described above, the tentative option "continuous printing" can be determined as the determinate option by pressing the selection key (the screen transits to the screen D23 after the determination). In FIG. 7, from the selection screen (D23) described above, for example, the tentative option "not performed" can be determined as the determinate option by pressing the selection key (the screen transits to the screen D26 after the determination).

For example, if the HELP key is pressed in the selection screen described above (D20 of FIG. 6), the function explanation for describing the functions when the tentative option "continuous printing" is determined as it is (as the determinate option) is subjected to the help display as the handling explanation (D21). For example, if the HELP key is pressed in the state of the selection screen described above (D23 of FIG. 7), the operating explanations for guiding to the next operation from the state of the option display on the selection screen are subjected to the help display as the handling explanations (D24). Specifically, the help displays described above make it possible for the user to easily and quickly view the handling explanations at once during the operations even if the user has no "explanation manual" in hand. In addition, the user can easily and quickly grasp the next operation method and the function of the tentative option at once.

In the case of this embodiment, unlike the conventional case, the original screen and the help screen are not displayed in a side-by-side relationship, the options, the function explanation and the operating explanations are not displayed in a side-by-side relationship on the guidance screen, and the option display and the explanation display are not displayed in a side-by-side relationship. Namely, the option display is switched to the help display (the explanation display). Thus, the printer requires a smaller display screen than that of the conventional case.

As in the selection screens described above (D20 of FIG. 6 and D23 of FIG. 7), pressing of the HELP key (request of the help display: request of the handling explanations) is performed from the state of the option display in which the tentative option exists. Thus, it is clear that the operation method from the state and the explanation of the tentative option are requested. In other words, an object whose explanation is requested is clear. Consequently, unlike the conventional help screen and the like, the next operation method, the function of the tentative option and the like can be subjected to the help display without searching with keywords and the like.

The help display is displayed by pressing the HELP key when the user needs the display of the handling explanations (in other words, the handling explanations are displayed as the need arises). Thus, operability is not lowered unlike the conventional automatic display of function explanation in which the function explanation is automatically displayed in a single uniform way regardless of the need of the function explanation.

Therefore, in the tape printer 1 of this embodiment, the user can easily and quickly view the "handling explanations" for the various functions and operation methods at once during the operations without searching and the like even if the user has no "explanation manual" (manual) in hand and even if the display screen is small as shown in the drawing.

Here, in the case of this embodiment, display switching between the option display screens described above (the selection screens: for example, D20=D22 and D23=D25) and the help display screen described above (for example, D21 and D24) may be performed in the following manner. For example, a plurality of display modes including an option display mode for commanding the option display and an explanation display mode for commanding the help display (display of handling explanations: explanation display) are defined/controlled by using flags in the RAM 230 and the like. Accordingly, the display modes are switched between one another. In this case, on the display screen 41, the help display is performed in the explanation display mode and the option display is performed in the option display mode. In this case, the HELP key is means for alternately switching the two display modes described above between one another. To be more specific, the HELP key is means for requesting the help display by switching from the option display mode to the explanation display mode as a result of first pressing, and is means for removing (releasing) the help display by switching (returning) from the explanation display mode to the option display mode as a result of the next pressing.

In other words, in the tape printer 1 described above, the plurality of display modes including the option display mode and the explanation display mode are defined and the display is performed in accordance with the display mode. Thus, only by switching from the option display mode to the explanation display mode, the handling explanations can be requested. In addition, the user can easily and quickly view the handling explanations at once during the operations without searching and the like even if the display screen is small. In the case of this embodiment, the option display mode and the explanation display mode are alternately switched between one another by the operation of the HELP key. Thus, by operating a single key, the user can easily and quickly request and view the handling explanations and return the display to the original display.

In the example described above, after the foregoing state of the help display (D24) is returned to the selection screen by pressing the HELP key again (D25), the operations are performed by using keys whose operations are explained (previously allocated keys such as the selection key, the respective cursor keys and the deletion key: hereinafter referred to as "explained keys"). However, direct screen transition to the respective screens (the foregoing D26, D27, D23 and the like) may be performed by directly operating the explained keys from the state of the help display (D24) without returning to the selection screen.

Figure 8:
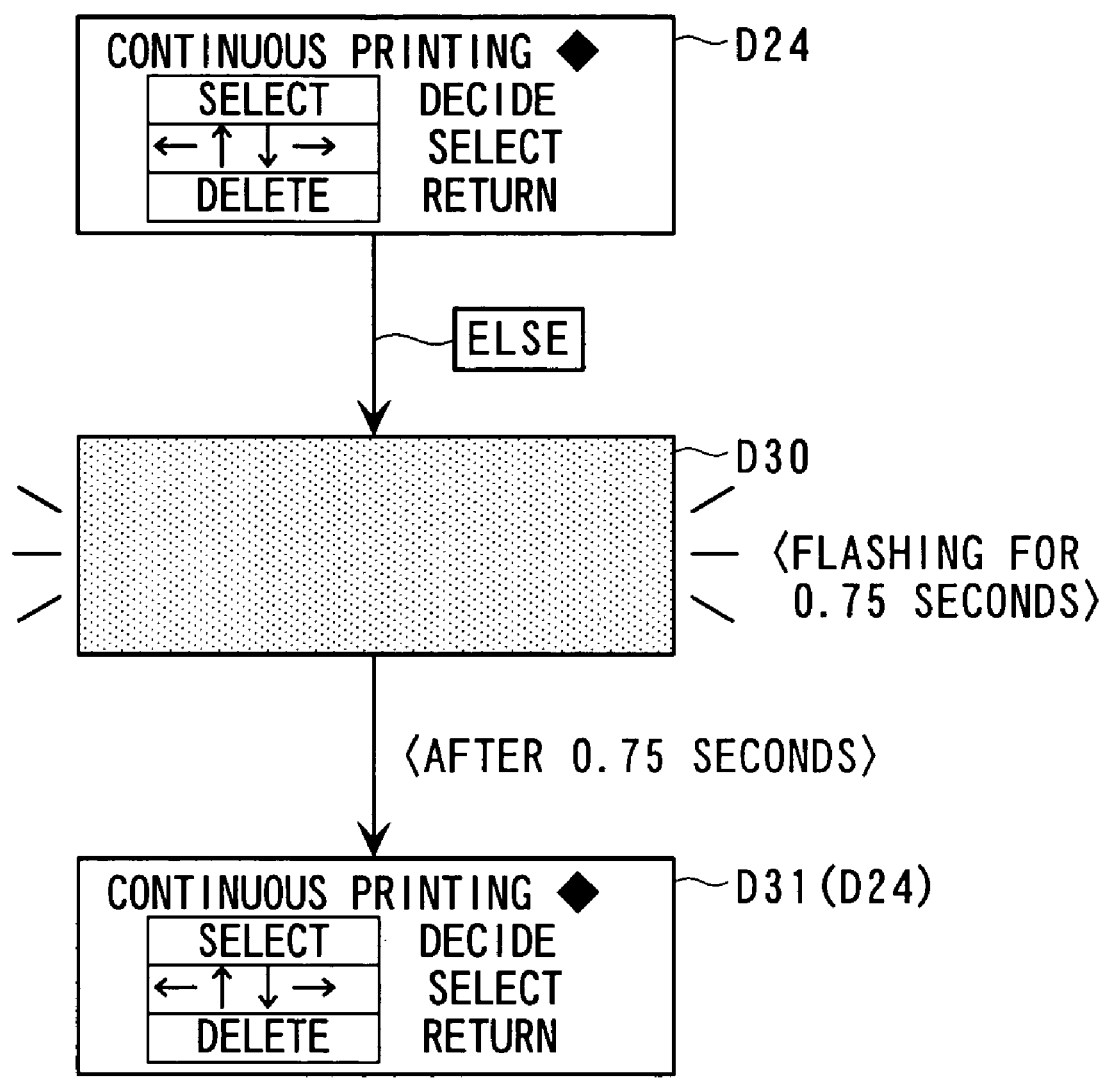
FIG. 8 is an explanatory view similar to FIG. 6, showing one example when an undefined key is operated from the state of the help display of FIG. 7.

In this case, as shown in FIG. 8, for example, when a key other than the explained keys described above (this type of undefined keys will be hereinafter collectively called as an "ELSE key") is pressed, an error annunciation indicating a "weak warning" is made by displaying a flashing screen for a predetermined period of time (for example, about 0.75 second) and emitting a short beep sound (D30). Thereafter, the screen can be returned to the original screen (D31: the same as D24).

In the (first) embodiment described above, the option display mode and the explanation display mode are switched between one another every time when the HELP key is pressed. However, the display mode may be switched to the explanation display mode only for a period of pressing the HELP key and returned to the option display mode by removing the help display at the point where the HELP key is released.

Figure 9:
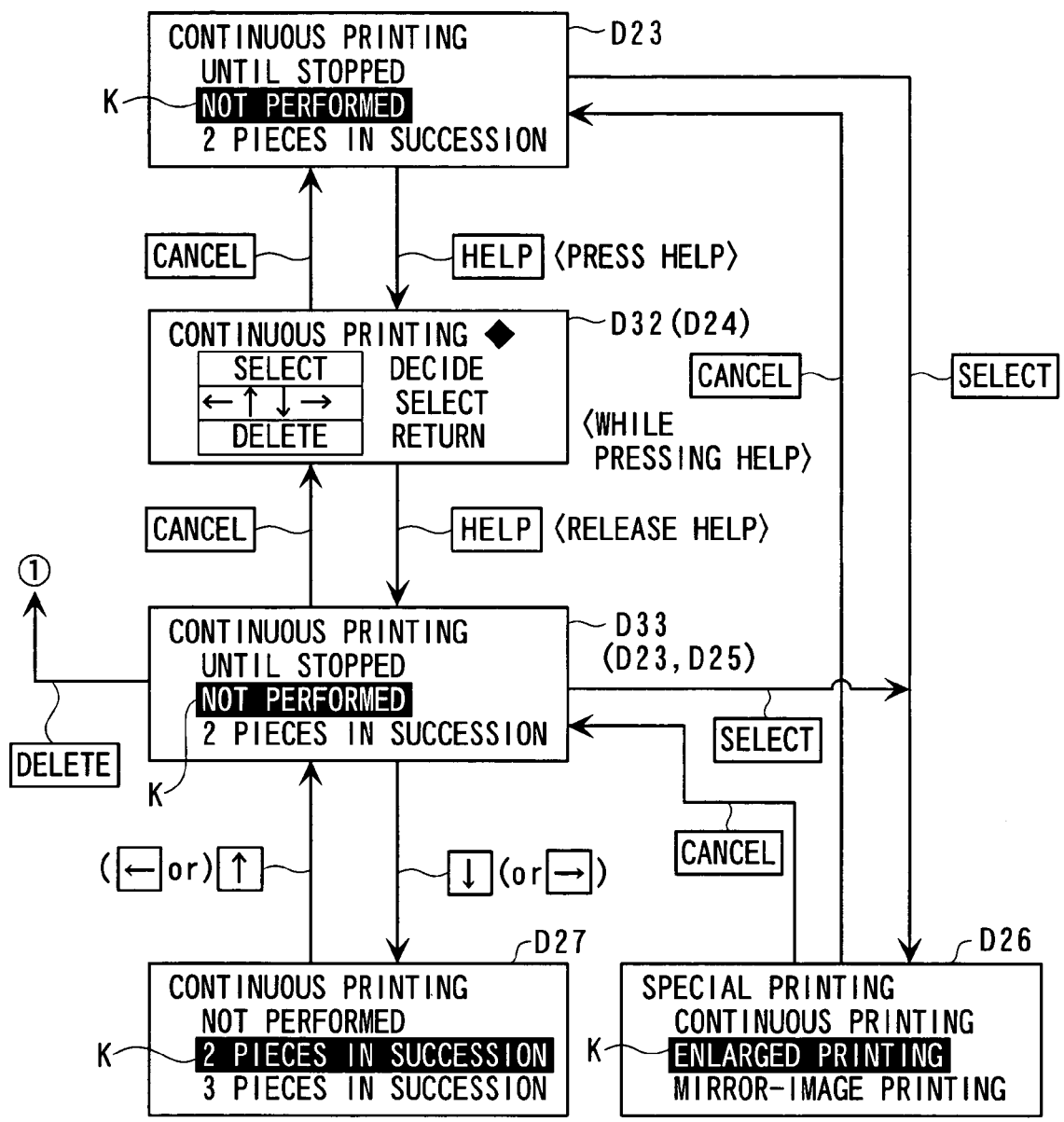
FIG. 9 is an explanatory view similar to FIG. 6, showing another example of performing help display according to a second embodiment.

The example described above will be described as a second embodiment. In this embodiment, for example, as shown in FIG. 9, when the HELP key is pressed from the state of the option display (D23: the same as D23 of FIG. 7), the help display is performed only while the HELP key is pressed (D32: the same as D24 of FIG. 7). Thereafter, at the point where the HELP key is released, the screen is returned to the original selection screen of the option display (D33: the same as D25 and D23 of FIG. 7).

Also in the second embodiment described above, after returning to the selection screen (D33), operations by using the explained keys are performed. However, for example, as shown in FIG. 10, the explained keys may be directly operated from the state of the help display (D32) without returning to the selection screen (that is, while pressing the HELP key)

and the following screen transitions may be performed. Namely, if the explained key is the selection key, after setting the tentative option "not performed" as the determinate option, the screen is shifted to the screen in which another option in "special printing" is set as the tentative option (D33: the same as D26 of FIG. 7 or FIG. 9). If the explained key is the cursor key, the screen is shifted to the screen in which another option in "continuous printing" is set as the tentative option (D34: the same as D27 of FIG. 7 or FIG. 9). If the explained key is the deletion key, the screen is shifted to the original selection screen in the first hierarchy (to D22 of FIG. 6 through ① shown in FIG. 10) in which "continuous printing" is set as the tentative option.

Figure 10:
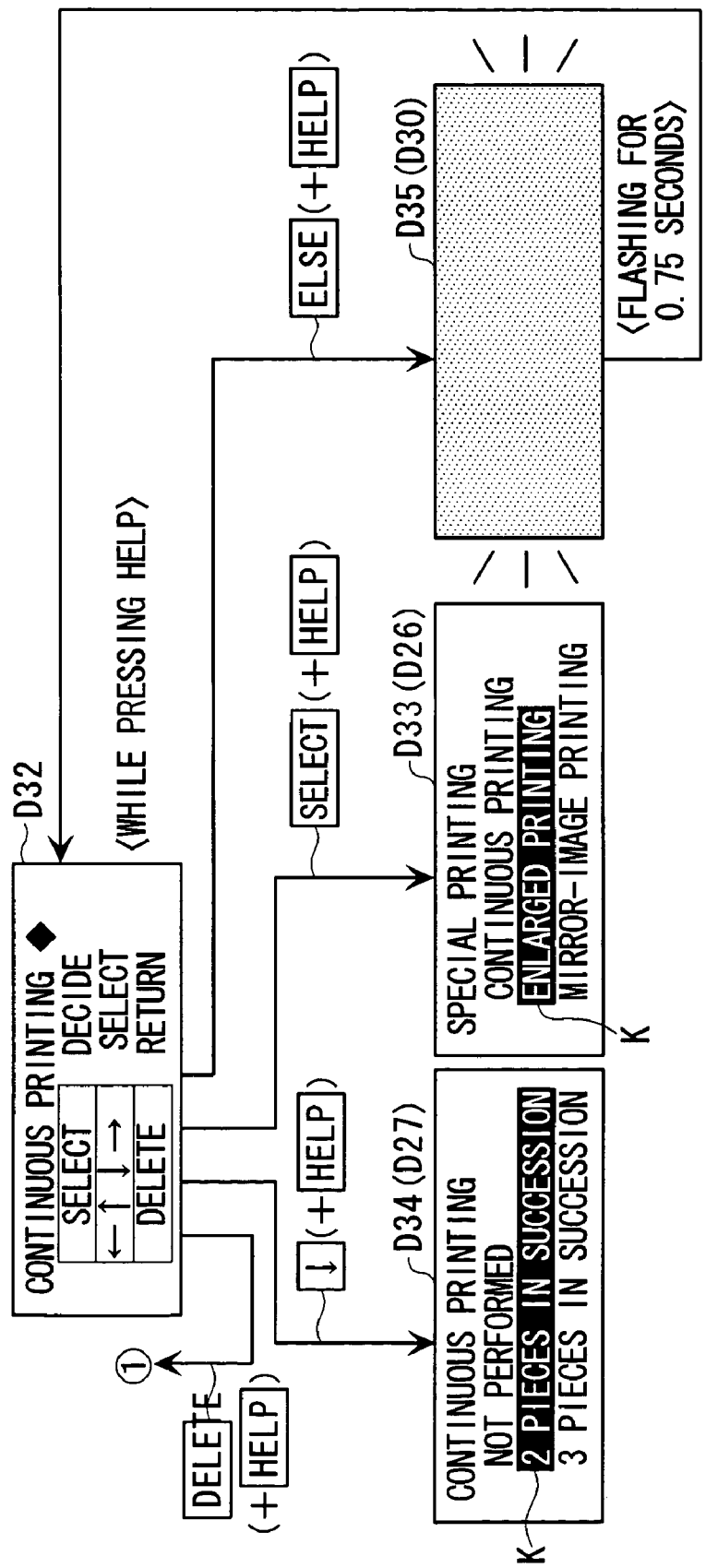
FIG. 10 is an explanatory view similar to FIG. 6, showing an operation example from the state of the help display of FIG. 9.

In this case, as shown in FIG. 10, when the ELSE key is pressed while pressing the HELP key from the state of the help display (D32), the error annunciation indicating the "weak warning" as described above is performed (D35: the same as D30 of FIG. 8) and, thereafter, the screen can be returned to the original screen (D32).

In the (first and second) embodiments described above, the handling explanations are displayed on the display screen by pressing the HELP key (the help display). However, since the display screen is small as shown in the drawings, a smaller font (an exclusively used font or the like), small patterns and the like may be used to enable display of more information in the handling explanations by the help display, that is, in the function explanation "the same label will be . . . " in D21 of FIG. 6 and the operating explanation in D24 of FIG. 7 and the like, for example.

In the respective embodiments described above, the help display (display of "handling explanations": explanation display) is indicated by the "doctor mark" ("♦" in the drawings). However, as long as the mark is the indication of the "handling explanations", other marks (for example, "?" and the like) may be used, font type and size of displayed characters may be changed to peculiar ones and displayed, a color of the display may be changed by turning the entire screen pale gray or a specific color, or the entire explanation may be decorated by being surrounded by a frame such as a balloon or being shaded.

In the help display on the small display screen, information of the handling explanations that can be displayed is limited. Thus, the handling explanations having too much information to be displayed in the help display (messages, operation guide and the like) are printed on the tape T. Accordingly, the handling explanations can be also displayed to the user. This case will be described below as a third embodiment.

Figure 11:
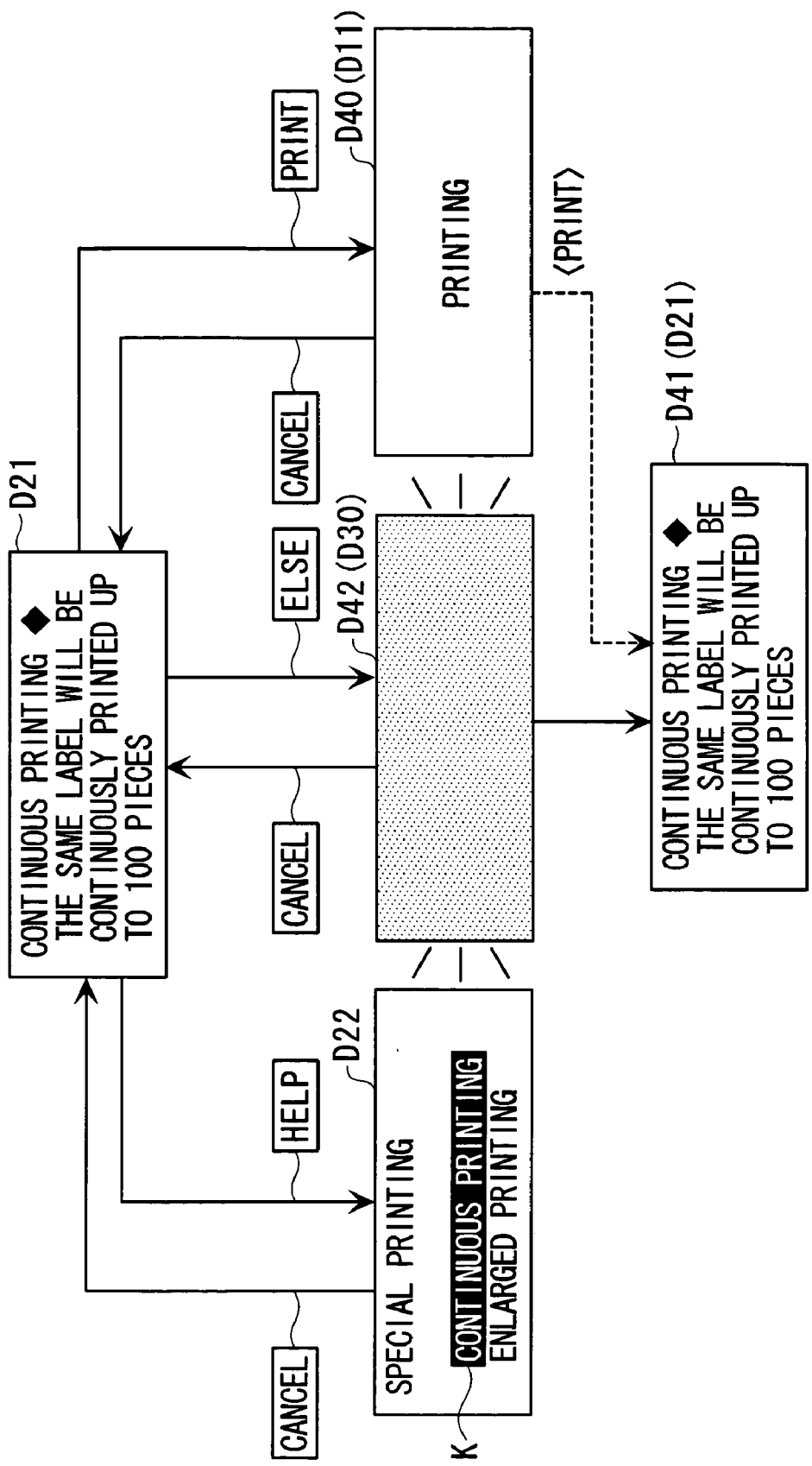
FIG. 11 is an explanatory view similar to FIG. 6, showing one example where help printing is possible according to a third embodiment.

For example, as shown in FIG. 11, when the HELP key is pressed from the state of the help display (D21: the same as D21 of FIG. 6), similarly to the first embodiment, the screen is returned to the original selection screen of the option display (D22: the same as D22 and D20 of FIG. 6). However, in this (third) embodiment, aside from this HELP key, a print key is set as a key which can be operated from the state of the help display. When the print key is pressed, a message of "printing" is displayed (D40: the same as D11 of FIG. 5A) and, as shown in FIG. 12A, a character string image of a more detailed handling explanation than the help display (D21) is printed as a print image G20 (D40). Namely, in the more detailed handling explanation described above, an explanation "in the middle (or on the way) of printing . . . " or the like is further added to the explanation "the same label will be . . . " of the help display. Thereafter, when the printing of the handling explanation (explanation printing: help printing) is completed, the screen is returned to the original state of the help display (D41: the same as D21).

Also in the case described above, as shown in FIG. 11, when the ELSE key other than those described above is pressed from the state of the help display (D21), the error annunciation indicating the "weak warning" as described above is performed (D42: the same as D30 of FIG. 8) and, thereafter, the screen can be returned to the original screen (D21).

As described above, in the tape printer 1 of this embodiment, in addition to the help display (display of the handling explanations: explanation display), the help printing (printing of the handling explanations: explanation printing) is possible. Thus, more information (explanations) than the help display (see D21 or the like) can be displayed (the print image G20 of FIG. 12A and the like).

In the third embodiment described above, the help printing is performed by pressing the print key from the state of the help display (D21 or the like). However, the help printing may be performed directly from the original state of the option display without the help display. This case will be described below as a fourth embodiment.

Figure 13:
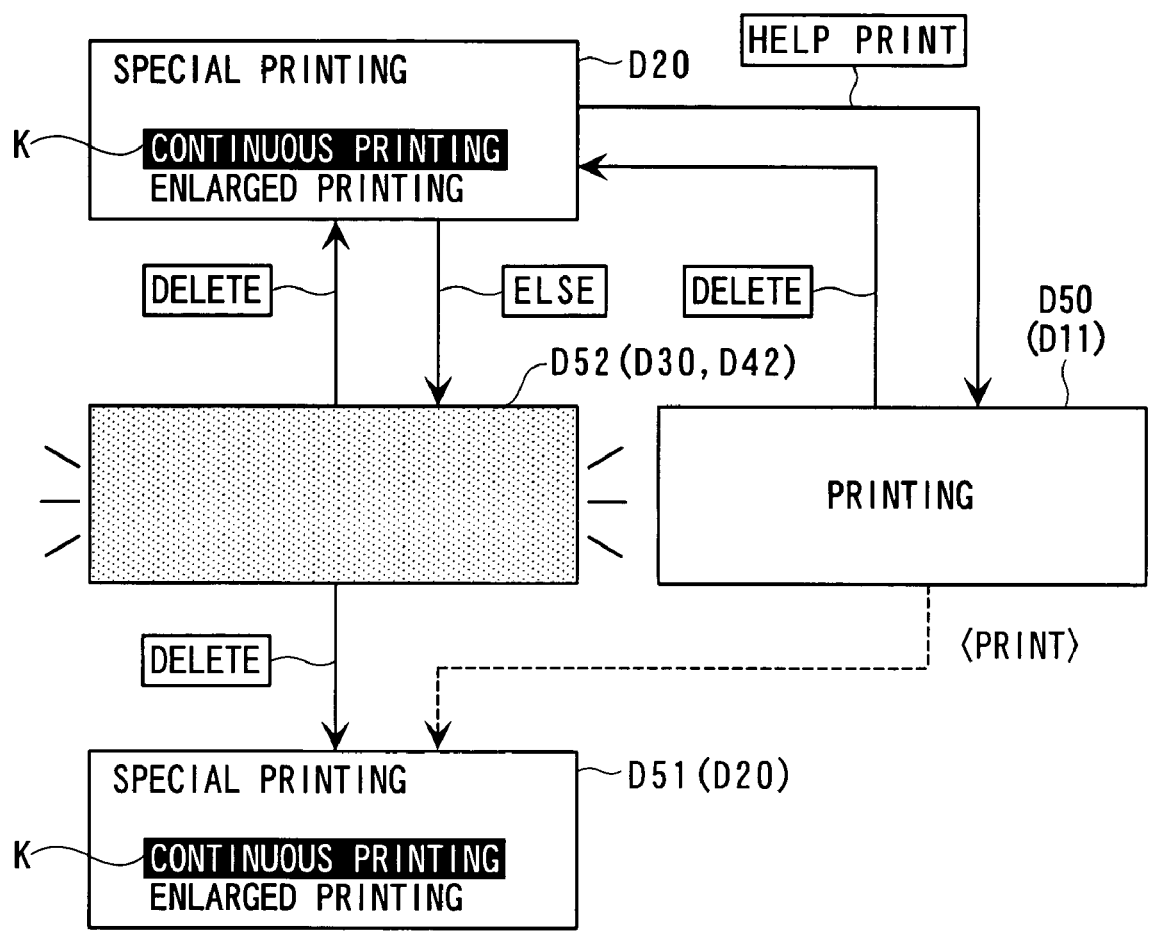
FIG. 13 is an explanatory view similar to FIG. 11, showing another example in which help printing is possible according to a fourth embodiment.

For example, as shown in FIG. 13, when a HELP print key is pressed from the original selection screen of the option display (D20: the same as FIG. 6), a message of "printing" is displayed (D50: the same as D11 of FIG. 5A) and the detailed handling explanation described above is printed, in FIG. 12A, as the print image G20 that is the character string image of the handling explanation. Subsequently, when the help printing is finished, the screen is returned to the original selection screen of the option display (D51: the same as D20 of FIG. 6). Also in this case, as shown in FIG. 13, when the ELSE key other than those described above is pressed from the state of the option display (D20), the error annunciation indicating the "weak warning" as described above is performed (D52: the same as D30 of FIG. 8) and, thereafter, the screen can be returned to the original screen (D51: the same as D20).

As described above, in the tape printer 1 of this embodiment, the help printing (explanation printing) is possible instead of the help display (explanation display). Thus, the help printing can be performed without the help display.

The help printing described above can thus be applied not only to a printer capable of the help display as described above but also to a printer which cannot perform the explanation display because the display screen is much smaller (extremely small) (for example, a screen capable of displaying only one short line, or the like). Thus, more handling explanations to be displayed can be displayed by the help printing. The help printing can thus be applied also to one having a system arrangement in which print means such as a printer is connected to a personal digital assistance with a small-size liquid crystal screen or the like, such as a portable telephone (one capable of becoming a printer as a whole).

In the (third and fourth) embodiments described above, as the help printing (explanation printing), aside from the explanations of the operation method and the like at the point such as "in the middle of (or in the course of) . . . " described above in FIG. 12A, there can also be added, e.g.: further supplementary explanation and explanations of a convenient use and the like (see the print in the lower part of the print image G21 in FIG. 12B); explanations of the options under the function (see the print in the lower part of the print image G22 in FIG. 12C); and a setting method for the function ("continuous printing" in the example shown in FIG. 12). As the setting method, explanation printing in which various innovative ideas are utilized can be performed in such a manner as descried below. Namely, in help printing which explains not only a simple entry to the function (an entry for selection) for one hierarchy (such as the print of "special print button" shown in the upper parts of FIGS. 12B and 12C) but also "decoration function-fine" which is set by selections in a multiple hierarchy such as pressing of a decoration → key selection of "expansion" → selection of "fine", for example, an explanation as a menu hierarchy such as "decoration button → expansion → fine" is printed.

In the (third and fourth) embodiments described above, the object to be printed in the help printing (explanation printing) is the tape T. Thus, after a label is created, the label can be attached to an object of attachment (through an adhesive surface) by peeling off a release paper on a back of the label. Thus, the tape printer of the embodiments can be utilized in such a manner that, for example, a frequently used function is subjected to the help printing and a label thus created is attached to the printer main body, office supplies on hand and the like and is referred to constantly. Thus, convenience thereof is improved. Particularly, in this case, the help printing which also includes the above-described convenient use, setting method and the like (see the print images G21 and G22 of FIGS. 12B and 12C) can be conveniently utilized.

If the tape printer of the embodiments is applied to various printers other than the tape printer (including the above-described one having the system configuration in which the print means is connected: the same hereinafter), for example, an object which can be attached to an object of attachment through an adhesive surface, such as a label and a sticker, is used as an object to be printed in the explanation printing. Thus, similarly, the tape printer can be conveniently utilized.

The explanation display method, such as the above-described explanation display and explanation printing, can be applied to programs processed by various printers capable of program processing. The method can be also applied to storage media such as a CD, an MD and a DVD, for example, for storing programs of the type described above. This type of programs are stored or read from the storage media and the like to be executed. Thus, the user can easily and quickly view the handling explanations, as the need arises, at once during the operations without searching and the like even if the display screen is small. It is needless to say that, besides the above, appropriate modifications are possible without departing from scope of the invention.

As described above, by using the printer, the method of displaying explanations of the printer, the program and the storage medium according to this invention, there can be attained effects in that the user can easily and quickly view the handling explanations, as the need arises, at once during the operations without searching and the like even if the display screen is small.

What is claimed is:

1. A printing apparatus having:
    display means for displaying an option display in which a plurality of options in a first hierarchy and related to printing are displayed on a display screen;
    tentative option designating means for designating at least one option out of the plurality of options as a tentative option on the display screen, wherein the tentative option is related to printing;
    selection determination means for determining the tentative option as a determinate option, wherein the determinate option is related to printing; and
    print means for printing based on the determinate option, wherein said printing apparatus comprises:
    explanation requesting means for requesting, before the determination, a handling explanation including at least one of an operating explanation for guiding a next operation from a state of the option display and a function explanation for explaining a function of the tentative option; and
    display switching means for switching the display of the display screen from the option display to:
    a function explanation display when the function explanation for explaining the function of the tentative option is selected as the handling explanation;
    a plurality of options in a second hierarchy that is related to the determinate option after the tentative option is determined as the determinate option; and
    an operating explanation display when the operating explanation for guiding the next operation from the state of the option display is selected as the handling explanation.

2. The printing apparatus according to claim 1, wherein:
    a plurality of display modes are defined inclusive of an option display mode for commanding the option display and an explanation display mode for commanding the explanation display;
    said explanation requesting means requests the handling explanation by switching from the option display mode to the explanation display mode; and
    said display switching means allows the display screen to perform the option display in the option display mode and the display of the handling explanation in the explanation display mode.

3. The printing apparatus according to claim 2, wherein said explanation requesting means is key operation means for alternately switching between the option display mode and the explanation display mode by operating an identical key.

4. The printing apparatus according to claim 1, further comprising:
    explanation printing commanding means for commanding explanation printing in which the handling explanation is printed by said print means before the determination.

5. The printing apparatus according to claim 4, wherein an object to be printed in the explanation printing is one which can be attached to an object of attachment through an adhesive surface.

6. A printing apparatus having:
    display means for displaying an option display in which a plurality of options in a first hierarchy related to printing are displayed on a display screen;
    tentative option designating means for designating at least one option out of the plurality of options displayed as a tentative option on the display screen, wherein the tentative option is related to printing;
    selection determination means for determining the tentative option as a determinate option, wherein the determinate option is related to printing; and
    print means for printing based on the determinate option, wherein said printing apparatus comprises:
    explanation requesting means capable of requesting, before the determination, a handling explanation including at least one of an operating explanation for guiding a next operation from a state of the option display and a function explanation for explaining a function of the tentative option;
    explanation printing commanding means for commanding explanation printing in which the handling explanation is printed by said print means when the handling explanation is; and
    display switching means for switching the display of the display screen from the option display to:
    a function explanation display when the function explanation for explaining the function of the tentative option is selected as the handling explanation;

a plurality of options in a second hierarchy that is related to the determinate option after the tentative option is determined as the determinate option; and an operating explanation display when the operating explanation for guiding the next operation from the state of the option display is selected as the handling explanation.

7. The printing apparatus according to claim 6, wherein an object to be printed in the explanation printing is one which can be attached to an object of attachment through an adhesive surface.

8. A method of displaying explanations of a printing apparatus which displays a plurality of options in a first hierarchy related to printing on a display screen, specifies at least one displayed option as a tentative option related to printing, determines the tentative option as a determinate option related to printing, and performs printing based on the determinate option, said method comprising:

an explanation requesting step for requesting, before the determination, a handling explanation including at least one of an operating explanation for guiding a next operation from a state of option display, in which the plurality of options are displayed, and a function explanation for a function of the tentative option; and a display switching step of switching the display of the display screen from the option display to:

a function explanation display when the function explanation for explaining the function of the tentative option is selected as the handling explanation;

a plurality of options in a second hierarchy that is related to the determinate option after the tentative option is determined as the determinate option; and an operating explanation display when the operating explanation for guiding the next operation from the state of the option display is selected as the handling explanation; and an explanation printing step of printing the handling explanation on an object to be printed.

\* \* \* \* \*